Hallowell & Barker,

Globe Valve,

No. 2,687, Reissued July 16, 1867.

Witnesses:
G. P. Hall
G. S. Washburn

Inventor:
Albert Hallowell and H. R. Barker,
by their Attorney
R. H. Eddy

N. PETERS, PHOTO-LITHOGRAPHER, WASHINGTON, D. C.

United States Patent Office.

ALBERT HALLOWELL AND HORACE R. BARKER, OF LOWELL, MASSACHUSETTS.

*Letters Patent No.* 51,177, *dated November* 28, 1865; *reissue No.* 2,687, *dated July* 16, 1867.

IMPROVEMENT IN STEAM-COCKS.

The Schedule referred to in these Letters Patent and making part of the same.

TO ALL WHOM IT MAY CONCERN:

Be it known that we, ALBERT HALLOWELL and HORACE R. BARKER, both of Lowell, in the county of Middlesex, and Commonwealth of Massachusetts, have invented a new and useful Improvement in Steam-Cocks; and we do hereby declare that the following is a full and exact description thereof, reference being had to the accompanying drawings, making a part of this specification, and to the letters of reference marked thereon, whereof—

Our invention relates to the means which we employ for preventing external leakage at the joint where the key which operates the valve-stem enters the cap of the valve-case. Much difficulty has been experienced in preventing such leakage, and some kind of packing possessing flexibility and elasticity, like caoutchouc or fibrous material, is generally applied, being held in place by packing-nuts or other suitable means. In our improved construction we have no elastic and perishable packing applied to the key which operates the valve-stem for the purpose of preventing leakage, but we employ a ground metallic joint for the same purpose, the male part of said joint being formed upon the key, and the seat or female part in the cap of the valve-case, as hereinafter more fully described. The two parts of such ground joint are always retained in contact while the stop-cock is in use, while the male part is free to turn readily in the seat or female part, so that the valve can be as readily operated in this form of construction as in stop-cocks in which packing is employed; and if the ground joint is properly constructed and fitted, no steam or other fluid, rising into the space about the valve-stem or key, can pass beyond the ground joint and cause external leakage.

Figure 2:
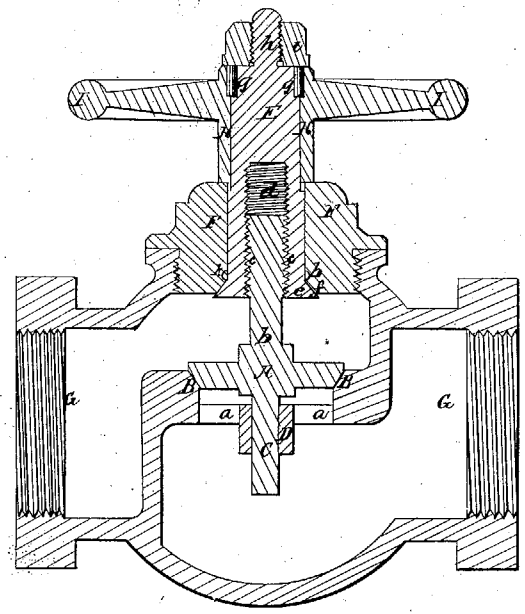
Figure 2 is a longitudinal vertical section.
Figure 1:
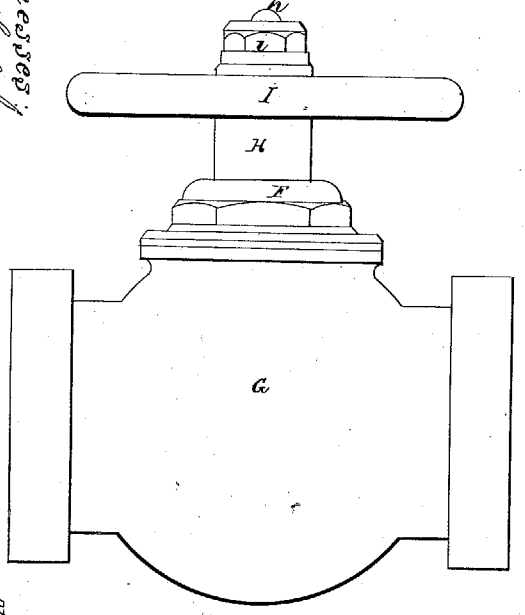
Figure 1 is a side elevation of said steam-cock.

The construction of our invention is as follows: G is the case or body of an ordinary stop-cock, of the form known as a globe-valve, having a steam-way or water-way through the same from end to end, and covered by the cap F. A is the valve disk, fitting the seat B B, and having a prismatic projection, C, or its equivalent, extending from and below it, and entering a corresponding hole made through a guide, D, held in place in the water-passage of the valve by radial arms *a a*. A male screw, *c*, is formed on the upper part of the stem *b* of the valve, and enters a corresponding female screw, *d*, made axially in a cylindrical key, E, which goes concentrically through the cap F. The said cylindrical key and the cap F we provide with a ground conical joint, the male part of the joint being shown at *e*, and the female part at *f*. A tube, H, attached concentrically to the hand-wheel I, encompasses that portion of the key E which projects above the cap F. A screw-nut, *i*, turns upon a male screw, *h*, projecting upward from the key E. One or more pins should be inserted vertically within the hand-wheel I and key E, as shown in fig. 2. The nut *i* turning on the screw *h* affords, with the tube H, a means of drawing the part *e* of the joint up to its seat *f*, as may be necessary to keep the parts *e* and *f* in proper contact, and compensate for their wear. By revolving the hand-wheel I we turn the key E, so as to move the valve A either off or towards its seat. There is arranged above the ground joint and in the cap F an annular chamber or groove, the object of which is to hold oil or grease, to keep the rubbing surface of the ground joint properly lubricated.

We would remark that the shank *b* of the valve may be prismatic, and enter a corresponding prismatic opening made in the key E, in which case the part C should screw into the part D. So, instead of making a female screw on the key E, and a corresponding male screw on the shank of the valve, a male screw may be projected from the key, and enter a female screw formed in the valve or its shank. Our improvement will suffice for either of the constructions.

What we claim as our invention, and desire to secure by Letters Patent, is as follows:

1. We claim, in a stop-cock, in which the valve-stem is operated by a valve-key connected with a hand-wheel, the arrangement of a ground joint, *e f*, the male part *e* being constructed upon the key E, and the seat or female part in the cap F of the valve-case G, substantially as set forth.

2. We claim the construction of the key-piece E, with its valve-like portion *e*, with reference to the seat *f* in the cap F, and the combination of the valve-stem *b* and key-piece E with a male and female screw-thread, whereby to operate the valve A, substantially as set forth.

3. We claim the arrangement of the hand-wheel I, tube H, the screw *h*, nut *i*, key E, and cap F, applied to the case G, in combination with the ground joint *e f*, substantially as described.

4. We claim the arrangement of the annular groove *k* with the ground joint and the key E and cap F, combined with the valve and its case, substantially as described.

Witness our hands this 27th day of May, A. D. 1867.

ALBERT HALLOWELL,
HORACE R. BARKER.

Witnesses:
JOHN DAVIS,
M. WHITHEEL.